US012811989B2

(12) United States Patent
Ding et al.

(10) Patent No.: US 12,811,989 B2
(45) Date of Patent: Nov. 24, 2026

(54) GENERATIVE ARTIFICIAL INTELLIGENCE (GenAI)-DRIVEN ENHANCEMENTS TO AN INTERNET PROTOCOL (IP) MULTIMEDIA SUBSYSTEM (IMS)

(71) Applicant: AT&T Intellectual Property I, L.P., Atlanta, GA (US)

(72) Inventors: Yuan Ding, Plainsboro, NJ (US); Joseph Dahan, Redmond, WA (US); Chaoxin Qiu, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 57 days.

(21) Appl. No.: 18/941,002

(22) Filed: Nov. 8, 2024

(65) Prior Publication Data

US 2026/0135892 A1 May 14, 2026

(51) Int. Cl.

*H04L 65/80* (2022.01)
*H04L 65/1016* (2022.01)
*H04L 65/1045* (2022.01)
*H04L 65/1076* (2022.01)

(52) U.S. Cl.

CPC ...... *H04L 65/1076* (2013.01); *H04L 65/1016* (2013.01); *H04L 65/1045* (2022.05); *H04L 65/80* (2013.01)

(58) Field of Classification Search

CPC ............. H04L 65/1076; H04L 65/1045; H04L 65/1016; H04L 5/80

See application file for complete search history.

(56) References Cited

U.S. PATENT DOCUMENTS

| | | | | |
|---|---|---|---|---|
| 8,521,858 | B2 * | 8/2013 | Shaikh | H04L 61/5007 709/227 |
| 11,632,403 | B1 * | 4/2023 | Kuravangi-Thammaiah | H04L 65/1046 709/224 |
| 12,273,843 | B2 * | 4/2025 | Foti | H04L 65/1073 |
| 2021/0344727 | A1 * | 11/2021 | Cisse | H04L 65/1083 |
| 2022/0038509 | A1 * | 2/2022 | Maroto Gil | H04L 65/1073 |
| 2024/0275825 | A1 * | 8/2024 | Filart | H04L 65/1069 |
| 2026/0025418 | A1 * | 1/2026 | Khan | H04L 65/1045 |

* cited by examiner

*Primary Examiner* — Frantz B Jean

(74) *Attorney, Agent, or Firm* — Guntin & Gust, PLC; Kenneth S. Kwan

(57) ABSTRACT

Aspects of the subject disclosure may include, for example, collecting data relating to at least one CSCF of an IMS, resulting in collected data, extracting one or more features or metrics from the collected data, resulting in extracted data, storing the extracted data in one or more vector databases, causing a query to be submitted to the one or more vector databases for retrieving information regarding the at least one CSCF, resulting in retrieved information, analyzing the retrieved information using one or more AI models, and generating an output based on the analyzing for modifying an operation relating to the at least one CSCF. Other embodiments are disclosed.

20 Claims, 12 Drawing Sheets

200

220

230

250

260

270

300

600

GENERATIVE ARTIFICIAL INTELLIGENCE (GenAI)-DRIVEN ENHANCEMENTS TO AN INTERNET PROTOCOL (IP) MULTIMEDIA SUBSYSTEM (IMS)

FIELD OF THE DISCLOSURE

The subject disclosure relates to generative artificial intelligence (GenAI)-driven enhancements to Internet Protocol (IP) Multimedia Subsystem (IMS) functionality.

BACKGROUND

In telecommunications, the rise in fraudulent activities, such as robocalls and sales scams, poses significant challenges. Traditional detection methods rely on manual monitoring, which is impractical due to the sheer volume of daily calls. Additionally, conventional IMS frameworks struggle with network efficiency and performance, often relying on static resource provisioning and manual adjustments that fail to adapt to real-time network conditions. This leads to network congestion, increased latency, and reduced service quality, particularly during peak times, as well as inefficiencies such as over-provisioning or under-provisioning, which negatively impact both cost and user experience. Furthermore, traditional IMS systems typically employ reactive maintenance strategies, addressing issues only after they occur. This leads to unexpected downtime, service interruptions, and increased operational costs. Security and threat detection also remain critical challenges, as conventional systems tend to lack advanced measures for detecting and responding to sophisticated cyber threats in real-time.

BRIEF DESCRIPTION OF THE DRAWINGS

Reference will now be made to the accompanying drawings, which are not necessarily drawn to scale, and wherein.

DETAILED DESCRIPTION

Figure 1:
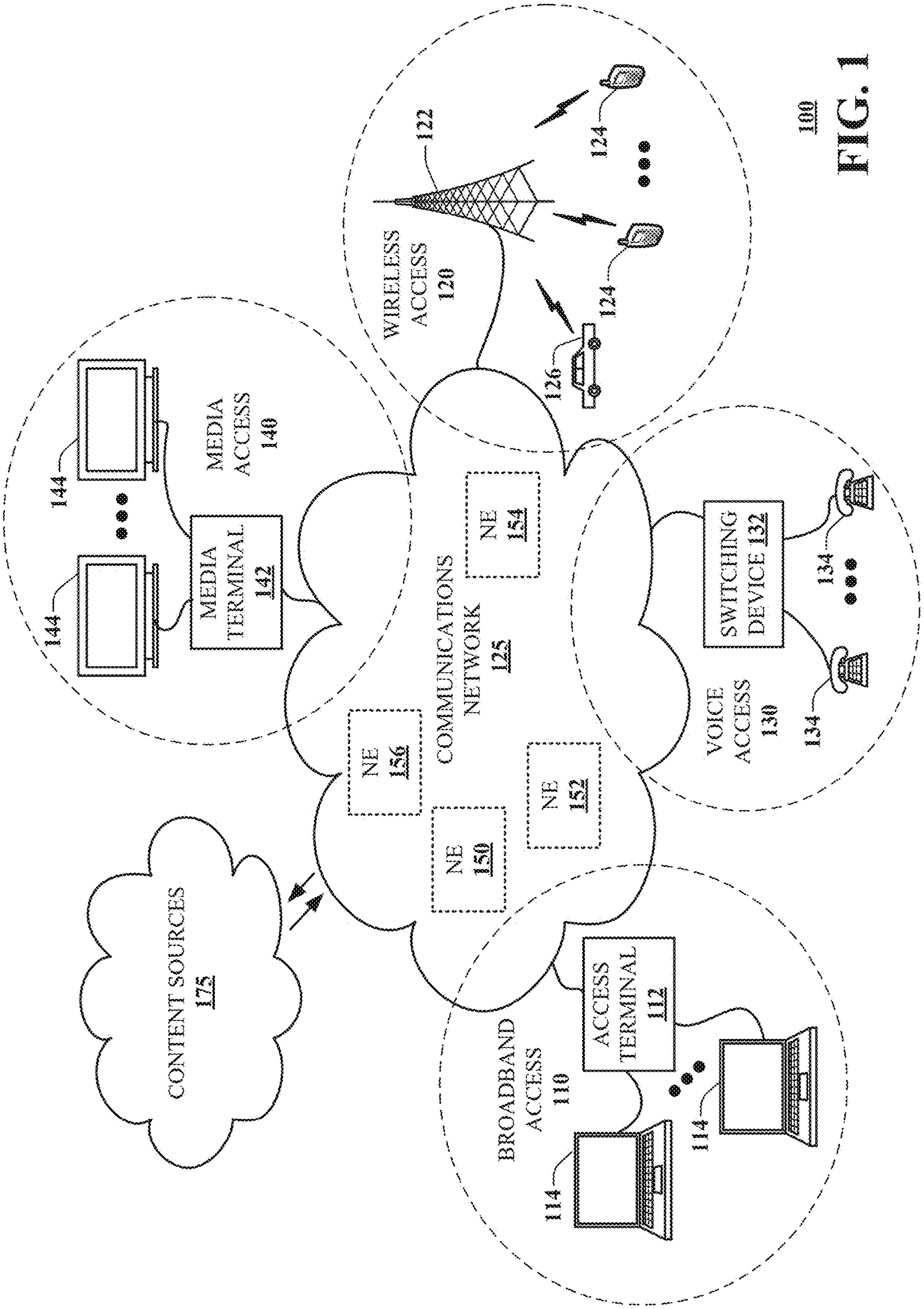
FIG. 1 is a block diagram illustrating an exemplary, non-limiting embodiment of a communications network in accordance with various aspects described herein.

The subject disclosure describes, among other things, illustrative embodiments of an AI-driven IMS framework, particularly a RAG-based GenAI system, that is capable of collecting data relating to one or more CSCFs of an IMS, analyzing features/metrics extracted from the data, and using trained AI model(s) to generate actionable recommendations based on the analysis. In exemplary embodiments, the RAG system may facilitate the prediction of network load, improvement or optimization (or approximate optimization) of routing paths, and enhancement of security by detecting anomalies. In various embodiments, the RAG system may utilize machine learning (ML) to personalize user experiences, dynamically adjust service quality, and/or predict user behavior for proactive management. In one or more embodiments, the RAG system may utilize AI to analyze call data and user feedback to enhance spam detection capabilities. The RAG system may facilitate real-time (or near real-time) dynamic decision-making, such as adjustments to service quality based on network conditions or user preferences. Continuous learning mechanisms may update AI models with new data as network conditions change, while reinforcement learning may adapt AI strategies over time to enhance performance and efficiency. ML model(s) may be trained using historical data to predict network conditions, user behavior, and/or service demand.

Exemplary embodiments of the RAG system employ GenAI to analyze call behaviors and patterns in real-time (or near real-time), and to identify suspicious activities that are indicative of fraud. By examining factors, such as call duration, voicemail consistency, and/or pick-up rates, the RAG system advantageously automates the detection process and integrates user feedback to refine its accuracy. For example, detection of a phone number that is making thousands of calls with low engagement and uniform voicemail lengths may be flagged as potentially fraudulent. Continuous improvement in the AI model provides for timely alerts and enhances the overall security of communication networks, which ensures a cleaner and more secure environment for users.

AI-driven predictive maintenance and dynamic resource management also significantly enhances network efficiency and performance. By leveraging advanced AI algorithms, the RAG system dynamically allocates resources based on real-time (or near real-time) network conditions, which improves or optimizes (or approximately optimizes) performance. This approach reduces network congestion and latency, and improves service quality and reliability, especially during peak times. Predictive maintenance capabilities foresee potential network issues, which enables proactive measures that reduce downtime and provides for continuous service availability.

The RAG system also provides for improved security and threat detection through AI-driven measures, such as anomaly detection and automated threat response. These advanced security measures protect the network and users or user data from sophisticated cyber threats (e.g., AI-generated spam) and threatening voice communications. The integration of RAG within the GenAI capable system thus enhances the ability to identify and mitigate threats, which provides for a more secure communication environment.

Integrating RAG into the IMS framework also offers numerous other benefits. For instance, in analyzing Session Initiation Protocol (SIP) messages, RAG can retrieve relevant historical data and patterns related to similar messages, which enables the generative model to produce more accurate traffic predictions and improve or optimize (or approximately optimize) session management. This provides for proactive resource management and maintains high Quality of Service (QoS) even during peak times. In the context of user profile analysis within the Home Subscriber Server (HSS), RAG can retrieve past interactions and preferences to generate personalized service recommendations. By combining historical data with generative capabilities, the RAG system offers tailored services that enhance user satisfaction and retention. Additionally, for security enhancements, RAG can detect anomalies in signaling data by retrieving information about known threats from a comprehensive database. This proactive approach aids in producing accurate threat analyses, mitigating potential security breaches, and maintaining network integrity. Embodiments of the RAG system also enable personalization of user experiences and improved service quality through intelligent decision-making. By analyzing user behavior and preferences, the RAG system offers highly personalized services, and can adjust service quality in real-time (or near real-time) according to network conditions.

Embodiments of the RAG system also reduce a network operator's reliance on external vendors, which mitigates risks associated with vendor dependencies and enhances the network's overall resilience and scalability.

One or more aspects of the subject disclosure include a device, comprising a processing system including a processor, and a memory that stores executable instructions that, when executed by the processing system, facilitate performance of operations. The operations can include collecting data relating to at least one Call Session Control Function (CSCF) of an Internet Protocol (IP) Multimedia Subsystem (IMS), resulting in collected data. Further, the operations can include extracting one or more features or metrics from the collected data, resulting in extracted data. Further, the operations can include storing the extracted data in one or more vector databases. Further, the operations can include causing a query to be submitted to the one or more vector databases for retrieving information regarding the at least one CSCF, resulting in retrieved information. Further, the operations can include analyzing the retrieved information using one or more artificial intelligence (AI) models. Further, the operations can include generating an output based on the analyzing for modifying an operation relating to the at least one CSCF.

One or more aspects of the subject disclosure include a non-transitory machine-readable medium, comprising executable instructions that, when executed by a processing system including a processor, facilitate performance of operations. The operations can include receiving call data from a plurality of Call Session Control Functions (CSCFs) of an Internet Protocol (IP) Multimedia Subsystem (IMS), resulting in received call data, wherein the call data relates to one or more telephone numbers (TNs) associated with spam Further, the operations can include utilizing the received call data to train an artificial intelligence (AI) model on characteristics of spam calls, resulting in a trained AI model. Further, the operations can include storing vectors associated with the received call data in one or more vector databases. Further, the operations can include continuously collecting additional call data from the plurality of CSCFs for storage as additional vectors in the one or more vector databases. Further, the operations can include querying the one or more vector databases to retrieve current and historical call data, resulting in retrieved data. Further, the operations can include performing an analysis of the retrieved data. Further, the operations can include based on the analysis, utilizing at least a portion of the retrieved data to re-train the AI model for increased spam call detection accuracy.

One or more aspects of the subject disclosure include a method. The method can comprise collecting, by a processing system including a processor, data relating to a Call Session Control Function (CSCF) of an Internet Protocol (IP) Multimedia Subsystem (IMS), resulting in collected data. Further, the method can include extracting, by the processing system, one or more features or metrics from the collected data, resulting in extracted data, for storage in one or more vector databases. Further, the method can include periodically causing, by the processing system, a query to be submitted to the one or more vector databases for retrieving information regarding the CSCF, resulting in retrieved information. Further, the method can include analyzing, by the processing system, the retrieved information using one or more artificial intelligence (AI) models. Further, the method can include causing, by the processing system, an output command generated based on the analyzing to be provided to one or more network devices or network management systems to trigger adjustment of one or more network-related parameters.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, GenAI-driven enhancements to IMS functionality. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
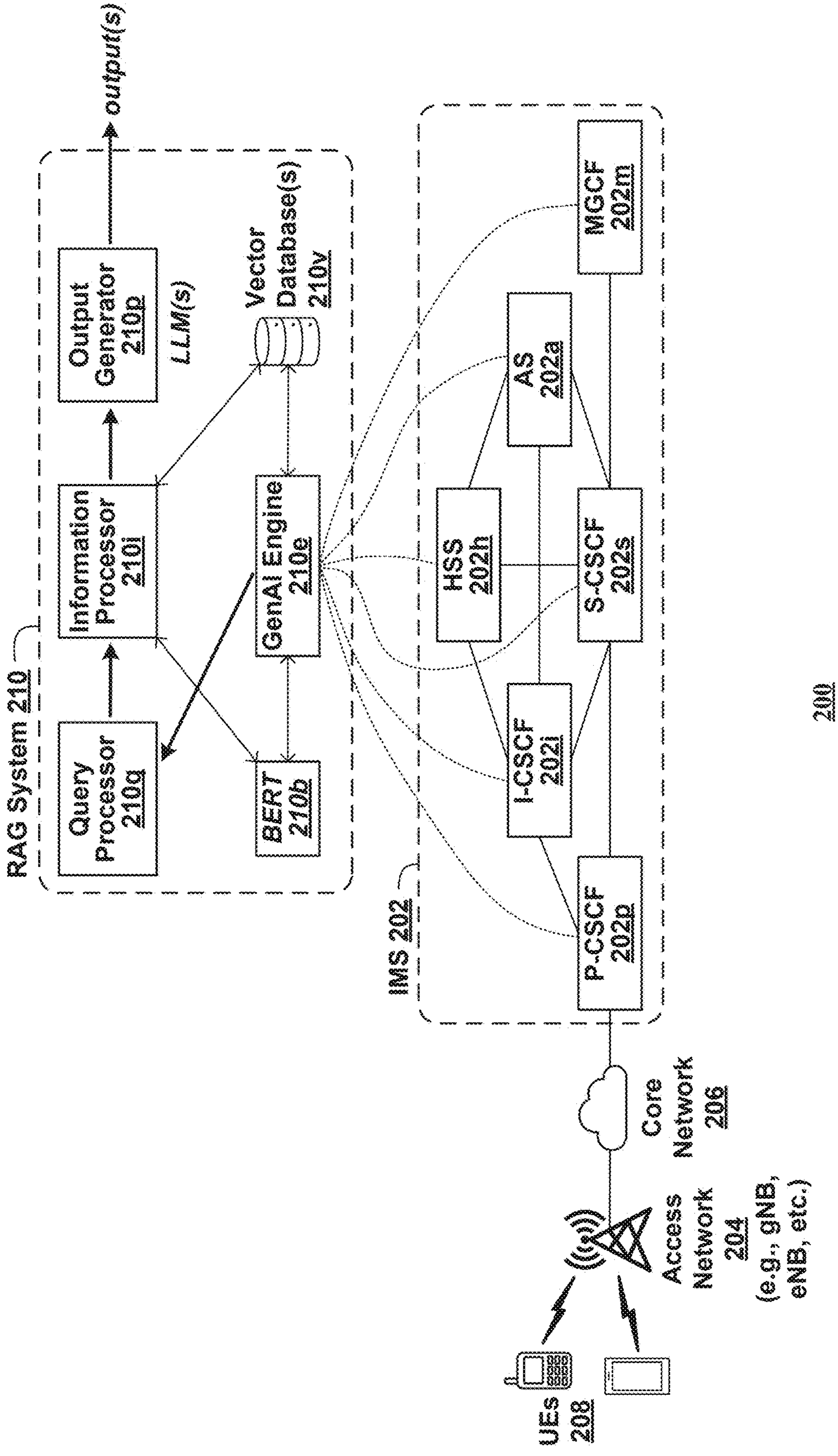
FIG. 2A is a block diagram illustrating an example, non-limiting embodiment of a system functioning within, or operatively overlaid upon, the communications network of FIG. 1 in accordance with various aspects described herein.

FIG. 2A is a block diagram illustrating an example, non-limiting embodiment of a system 200 functioning within, or operatively overlaid upon, the communications network 100 of FIG. 1 in accordance with various aspects described herein. The network system 200 may include an IMS (or IMS network) 202, an access network 204 (e.g., a radio access network (RAN)), a core network 206, user equipment (UEs) 208, and a RAG system 210.

The access network 204 may include network resources, such as one or more physical resources (or network nodes). The physical resources may include base station(s), such as one or more eNodeBs (eNBs), one or more gNodeBs (gNBs), and/or the like. In various embodiments, the physical resources may additionally, or alternatively, include one or more satellites and/or uncrewed aerial vehicles (UAVs), one or more Gigabyte Passive Optical Networks (GPONs) and/or related components (e.g., Optical Line Terminal(s) (OLT), Optical Network Unit(s) (ONU), etc.), and/or the like. A base station may employ any suitable radio access technology (RAT), such as long term evolution (LTE), 5G, 6G, or any higher generation RAT. In various embodiments, the access network 204 can include various types of heterogeneous cell configurations with various quantities of cells and/or types of cells. The access network 204 may be in communication with the core networks 206 via intermediate links provided by backhaul or transport network(s) (not shown). The transport network(s) may include traditional transport network technologies, such as optical fibers, microwave links, wireless point-to-point technologies, etc.

The core network 206 may include various network devices and/or systems that provide a variety of functions. Examples of functions provided by, or included, in the core network 206 include an access mobility and management function (AMF) configured to facilitate mobility management in a control plane of the network system 200, a User Plane Function (UPF) configured to provide access to a data network (such as a packet data network (PDN) in a user (or data) plane of the network system 200), a Unified Data Management (UDM) function, a SMF, a Policy Control Function (PCF), and/or the like. For instance, the core network 206 may include an evolved packet core (EPC) (associated with a mobility management entity (MME)), a 5G core (5GC) (associated with an SMF), a 6G core (6GC) (associated with a control plane function (CPF)), and/or a Broadband Network Gateway (BNG). In various embodiments, the core network 206 may include one or more devices implementing other functions, such as a master user database server device for network access management, a PDN gateway server device for facilitating access to a PDN, and/or the like. The core network 206 may be in further communication with one or more other networks (e.g., one or more content delivery networks (CDNs)), one or more services, and/or one or more devices. In one or more embodiments, the core networks 206 may be distributed cores.

It is to be understood and appreciated that the network system 200 can include any number/type of access network (e.g., any number/type of physical resources) and any number/type of core network (e.g., any number/type of cores, interfaces, etc.), and thus the number/types of these networks and their components illustrated in, or described with respect to, FIG. 2A are for illustrative purposes only.

UEs 208 may include communication and/or computing devices, which may include a mobile phone (e.g., a smart phone, a radiotelephone, etc.), a desktop computer, a laptop computer, a tablet computer, a handheld computer, a display device, a gaming device, a wearable communication device (e.g., a smart wristwatch, a pair of smart eyeglasses, augmented reality (AR)-/virtual reality (VR)-/mixed reality (MR)-related gear (e.g., a pair of glasses or googles, a headset, a hat, glove(s), a mask, a jacket, a sock or shoe, a pair of pants or shorts, headphones, and/or the like), etc.), a similar type of device, or a combination of some or all of these devices. The UEs 208 can be equipped with one or more transmitter (Tx) devices and/or one or more receiver (Rx) devices configured to communicate with, and utilize network resources of, the network system 200. A UE 208 may include various hardware and/or software resources, such as processing units (e.g., one or more computer processing units (CPUs) and/or graphics processing units (GPUs)), one or more memories (e.g., random-access memories, solid-state drives (SSDs) or hard disk drives (HDDs), etc.), network interface cards (NICs), network management systems, or the like. A UE 208 may include various sensors and/or interfaces that enable interaction with a user and the surrounding environment. For instance, a UE 208 may include a touchscreen interface, cameras, microphones, and other input/output components.

The IMS 202 may be an architectural framework that is designed to deliver IP multimedia services, and more particularly to support voice, video, messaging, and data services over IP networks. At the core of the IMS 202 are CSCFs, which include a P-CSCF 202*p*, an Interrogating CSCF (I-CSCF) 202*i*, an S-CSCF 202*s*, an HSS 202*h*, an Application Server (AS) 202*a*, and a Media Gateway Control Function (MGCF) 202*m*.

The P-CSCF 202*p* may be a first point of contact for a UE 208 within the IMS 202, and may be configured to forward SIP messages between the UE 208 and an IMS core. The I-CSCF 202*i* may function as a query point to the HSS 202*h* to retrieve a requesting user's assigned S-CSCF 202*s*, and may be involved in routing SIP messages. The S-CSCF 202*s* may function as a central node that handles session control, service triggering, and user registration, and may interact with the HSS 202*h* to download user profiles and maintain session states. The HSS 202*h* may be a central database that stores user-related information, such as subscription data, authentication credentials, and service profiles. The HSS 202*h* may interact with the S-CSCF 202*h* to provide user profile information and support user authentication and authorization. The AS 202*a* may include one or more servers that host and execute IMS service applications, such as presence services, messaging, push-to-talk, and/or conferencing services. The AS 202*a* may interact with the S-CSCF 202*s* to provide these services to UEs 208. The MGCF 202*m* may be configured to translate SIP signaling from the IMS network to a Media Gateway (MGW) (not shown) for handling media streams. The MGCF 202*m* may facilitate interworking between the IMS network and a Public Switched Telephone Network (PSTN) (also not shown). The MGW may handle the conversion of media streams between different formats and protocols, and may be configured to facilitate the actual transmission of voice and video data between the IMS network and other networks.

Other functions/systems of the IMS 202 that are not illustrated in FIG. 2A (but may be illustrated in one or more other figures) may include a Breakout Gateway Control Function (BGCF), a Media Resource Function (MRF) (e.g., MRF 202*r* in FIG. 2D), a Signaling Gateway (SGW), and/or a Policy and Charging Rules Function (PCRF). The BGCF may be configured to determine the appropriate network for routing calls that need to be terminated outside of the IMS network, and to select the appropriate MGCF for PSTN calls. The MRF may provide media-related functionalities, such as mixing of media streams, media transcoding, and/or media announcements, and may be divided into a Media Resource Function Controller (MRFC) and a Media Resource Function Processor (MRFP). The SGW may provide signaling between the IMS network and other signaling networks, such as Signaling System No. 7 (SS7) or Signaling Transport (SIGTRAN), and may translate signaling protocols to ensure compatibility between different network types. The PCRF may be configured to manage policies and charging rules for the IMS network so as to ensure that network resources are allocated according to predefined policies and that users are charged appropriately for their usage.

The RAG system 210 may be designed to enhance the functionality of the communications network by leveraging GenAI and RAG techniques to process and generate insights from data. GenAI focuses on creating new content such as text, images, and music based on patterns learned during training. Unlike traditional AI, GenAI uses deep learning models, such as Generative Adversarial Networks (GANs), to produce novel outputs that mimic human creativity. These models are trained on extensive datasets, which enables applications in text generation, image creation, music composition, and more. RAG enhances AI performance by combining retrieval-based and generative models. RAG retrieves relevant information from a large data corpus and uses a generative model to produce coherent and contextually appropriate outputs. This approach ensures that generated content is informed by extensive data and tailored to specific queries, which improves the accuracy and relevance of AI-generated responses. By integrating these techniques, the RAG system 210 may provide a robust framework for improving or optimizing (or approximately optimizing) IMS network performance and delivering enhanced multimedia services via the IMS network.

As illustrated in FIG. 2A, the RAG system 210 may include a query processor 210*q*, an information processor 210*i*, an output generator 210*p*, a GenAI engine 210*e*, vector database(s) 210*v*, and a BERT model 210*b*.

The GenAI engine 210*e* may be configured to orchestrate the overall operation of the RAG system 210. In various embodiments, the GenAI engine 210*e* may trigger the query processor 210*q* to perform scheduled performance queries, and may utilize AI model(s) or algorithm(s) to predict network load, improve or optimize (or approximately optimize) routing paths, and/or enhance security by detecting anomalies.

In various embodiments, the AI model(s) may be trained via an AI architecture (e.g., an AI architecture 260 illustrated in FIG. 2F and described in more detail below). In certain embodiments, the AI model(s) may include one or more LLMs, such as an LLM that is based on the transformer model 270 illustrated in FIG. 2G and described in more detail below.

While FIG. 2A depicts the GenAI engine 210*e* as being a singular system, it may alternatively be implemented in a distributed manner where a respective GenAI engine 210*e* is dedicated for each IMS component—e.g., one GenAI engine 210*e* for the P-CSCF 202*p*, another GenAI engine 210*e* for the S-CSCF 202*s*, and so on. As another alternative, one GenAI engine 210*e* may be shared among two or more IMS components—e.g., one GenAI engine 210*e* for the P-CSCF 202*p* and the S-CSCF 202*s*, another GenAI engine 210*e* for the HSS 202*h* and the AS 202*a*, etc.

The vector database(s) 210*v* may store both historical and current data in a format that can be efficiently retrieved and processed. The vector database(s) 210*v* may serve as centralized repositories for network-related information (e.g., network load, routing paths, etc.), component performance metrics, user behavior data, etc. Centralizing the data allows for selective retrieval based on the needs of particular routines, such as assessing the performance of particular CSCFs. In certain embodiments, different vector database(s) 210*v* may be utilized to store various types of information. For example, one vector database 210*v* may store network load data, another vector database 210*v* may store system performance metrics, and yet another vector database 210*v* may store user behavior patterns. This approach avoids the need to access all data when only specific information is required, which enhances data retrieval efficiency and speed.

In some embodiments, individual sets of vector database(s) 210*v* may correspond to different functions. For example, one set of vector databases 210*v* may store data relating to the P-CSCF 202*p*, another set of vector databases 210*v* may store data relating to the S-CSCF 202*s*, another vector database 210*v* may store data relating to the I-CSCF 202*i*, and so on.

The query processor 210*q* may function as an interface between the GenAI engine 210*e* and the stored information, and may be configured to initiate and manage (e.g., structured) queries to retrieve relevant data from the vector database(s) 210*v*.

The information processor 210*i* may take the data retrieved by the query processor 210*q* and process the data to generate insights. As just one example, the information processor 210*i* may analyze the data to assess current network performance.

The BERT model 210*b* may be employed within the RAG system 210 to enhance natural language understanding and processing capabilities. The BERT model 210*b* may be utilized to facilitate the interpretation of complex data and generate contextually relevant insights.

The output generator 210*p*, which may include one or more LLMs, may be configured to generate actionable insights or recommendations based on the processed information from the information processor 210*i*. The output generator 210*p* may utilize the LLM(s) to articulate the insights in a human-readable format.

In various embodiments, the RAG system 210 may leverage AI to analyze various data relating to one or more of the IMS components, and predict actions that should be taken, including, for instance, dynamic resource allocation (e.g., changes to resource allocation), bandwidth adjustments, personalized service delivery, etc.

Figure 2B:
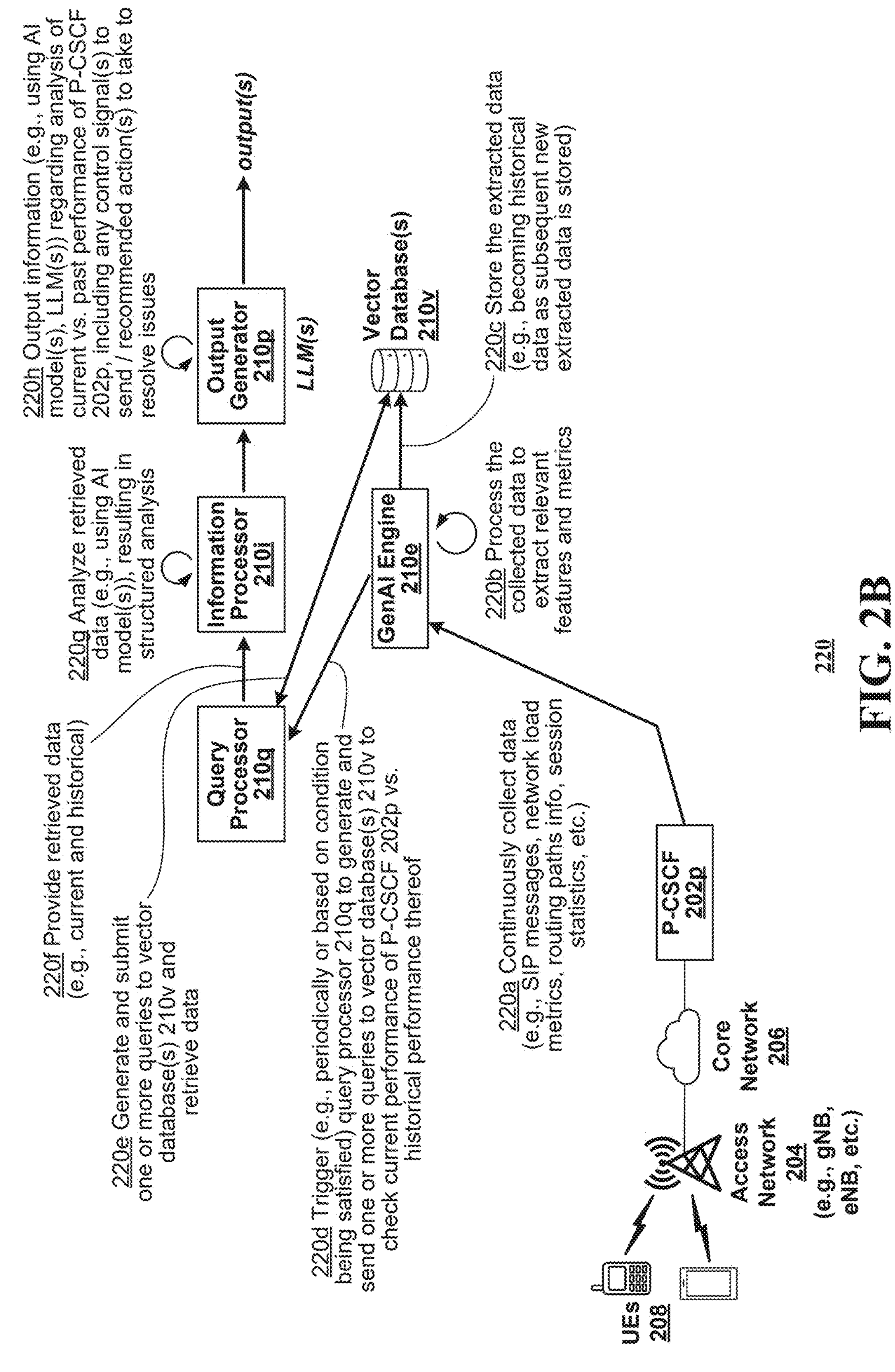
FIG. 2B illustrates an example use case of a Retrieval-Augmented Generation (RAG) system with respect to a Proxy Call Session Control Function (P-CSCF), in accordance with various aspects described herein.

FIG. 2B illustrates an example use case 220 of the RAG system 210 with respect to the P-CSCF 202*p*, in accordance with various aspects described herein. In exemplary embodiments, the RAG system 210 may coordinate with the P-CSCF 202*p* to predict network load, improve or optimize (or approximately optimize) routing paths, and/or enhance security by detecting anomalies.

At 220*a*, the GenAI engine 210*e* may continuously collect data from the P-CSCF 202*p*. The data may include SIP messages (e.g., used for signaling and controlling multimedia communication sessions), network load metrics (e.g., number of active sessions), routing paths info (e.g., paths that data packets traverse through the IMS network), session statistics (e.g., session duration, session quality, and/or other session-related performance indicators), etc. Some or all of this data may reveal call durations, average call lengths, caller and callee information, and/or reasons for calls, some or all of which may be useful for identifying call patterns and call-related performance metrics. Collected data can aid in assessments of the current network load and/or routing efficiency of the P-CSCF 202*p*, which can facilitate adjustments to the P-CSCF 202*p* and/or related components/functionality to achieve desired (e.g., improved or optimal) resource allocation and/or performance. For instance, analyzing how much traffic the network is handling and how efficiently it is being routed throughout the network can help identify potential bottlenecks or inefficiencies as well as to make accurate adjustments to improve performance, reduce latency, and enhance overall service quality. In some embodiments, the data may include user behavior information, such as, for instance, information regarding user feedback that is received after a call has ended. User behavior information can inform on user satisfaction, user preferences, and/or potential issues that are experienced during calls. For example, feedback on call quality or dropped calls can highlight areas that need improvement. This information can help tailor services to individual user needs, facilitate resource allocation, and enhance overall user experience.

At 220*b*, the GenAI engine 210*e* may process the collected data to extract relevant features and metrics. For example, the GenAI engine 210*e* may identify patterns in call traffic that indicate potential congestion or inefficiencies. These patterns may, for instance, include spikes in call volume during specific times, which can signal network congestion, or consistent delays in call setup times, which can indicate routing inefficiencies.

At 220*c*, the GenAI engine 210*e* may store the extracted data in the vector database(s) 210*v*. In one or more embodiments, the GenAI engine 210*e* may cause the extracted data to be converted into vectors. Such conversion may involve transforming the raw extracted data into numerical vectors that can be processed and retrieved. In various embodiments, different vector databases 210*v* may be used for various types of data, which allows for specialized storage and retrieval. For instance, one vector database 210*v* may store network load data, including metrics such as bandwidth usage, call volume, etc., another vector database 210*v* may store system performance data, including metrics such as latency, error rates, etc., and a separate vector database 210*v* many store user behavior data, such as patterns relating to call duration and frequency.

At 220*d*, the GenAI engine 210*e* may trigger (e.g., periodically or based on condition being satisfied) the query processor 210*q* to generate and send one or more queries to the vector database(s) 210*v* to check the current performance of the P-CSCF 202*p* versus the historical performance thereof. A given query may be structured to retrieve features or metrics, such as information relating to current network load information, routing paths information, session duration information, call drop rate information, latency information, jitter information, and/or the like. As an example, a query may be structured to extract data on the current and historical number of active sessions, a recent (e.g., within the past ten minutes) average call length and a historical average call length, a current packet loss rate and a historical package loss rate, and/or the like. Such metrics can help assess the P-CSCF 210*p*'s performance by comparing current conditions with historical conditions, allowing for the identification of trends and detection of anomalies that may necessitate adjustments to the network. In various embodiments, the GenAI engine 210*e* may trigger the querying every minute, every five minutes, every ten minutes, or the like to ensure up-to-date performance monitoring. In certain embodiments, the GenAI engine 210*e* may additionally, or alternatively, trigger the querying based on detection of an anomaly (e.g., a spike in call drop rate that exceeds a threshold, an increase in latency above a threshold, and/or the like) or performance degradation (e.g., one or more metrics exceeding or falling below predefined thresholds, such as bandwidth usage exceeding an acceptable limit or latency surpassing an acceptable limit).

At 220*e*, the query processor 210*g* may generate and submit one or more queries to the vector database(s) 210*v* based on the trigger, and may retrieve data therefrom using such queries. For example, the query processor 210*g* may use structured queries that are predefined and formatted to extract specific information from the vector database(s) 210*v*. A structured query may be, for instance, in Structured Query Language (SQL)—e.g., "SELECT network_load, routing_paths FROM vector_database WHERE timestamp=CURRENT_TIMESTAMP," which would retrieve the current network load and routing paths from a particular vector database 210*v*. In an example, the GenAI engine 210*e* may prompt the query processor 210*q* to retrieve specific data based on recent user interactions. For instance, if there is a sudden increase in user complaints or feedback indicating poor call quality (e.g., an increase that exceeds a particular rate), the GenAI engine 210*e* may decide to investigate further. The GenAI engine 210*e* may monitor metrics such as call drop rates, call duration, and/or frequency of service disruptions, where if one or more of these metrics exceed predefined thresholds, the GenAI engine 210*e* may recognize a potential issue with the user's experience. In such cases, the GenAI engine 210*e* may trigger the query processor 210*q* to retrieve specific data relating to recent user interactions. For instance, to assess a user's experience over the last five calls, the GenAI engine 210*e* may trigger a query to retrieve user behavior data, such as call duration and frequency information, from the vector database(s) 210*v*. User behavior data may reveal patterns indicative of fraud or spam, such as consistent call durations or repeated calls from unknown numbers. For example, if the GenAI engine 210*e* detects that a user frequently receives calls with similar voicemail lengths (e.g., within a threshold difference in length from one another) or from numbers with low pick-up rates (e.g., lower than a particular rate), the GenAI engine 210*e* may suspect fraudulent activity. In such cases, the GenAI engine 210*e* may trigger further analysis to confirm these suspicions. This analysis might involve cross-referencing the user's call data with known spam numbers or examining the frequency and timing of the calls. If the data aligns with typical spam patterns (e.g., satisfies similarity score(s)), the GenAI engine 210*e* may flag the activity as suspicious and take appropriate actions, such as alerting the user or blocking the number from calling the user or any other user. By leveraging user behavior data, the RAG system 210 can enhance its ability to detect and mitigate fraud, thereby providing a more secure and reliable user experience. In another case where the GenAI engine 210*e* determines a need to evaluate the performance of the P-CSCF 202*p*, the GenAI engine 210*e* may trigger the query processor 210*q* to execute a query to target network load data or system performance metrics. This targeted approach allows the GenAI engine 210*e* to efficiently gather relevant information for precise analysis and insights into network performance and/or user experience.

At 220*f*, the query processor 210*g* may provide the retrieved data (e.g., current and historical) to the information processor 210*i* for analysis.

At 220*g*, the information processor 210*i* may analyze the retrieved data. In one or more embodiments, the information processor 210*i* may utilize AI model(s) to analyze the retrieved data and assess the current performance of the P-CSCF. For example, the information processor 210*i* may employ ML algorithm(s) to detect patterns or anomalies in network load and/or routing efficiency, and compare these metrics against historical data to identify deviations from expected performance.

At 220*h*, the output generator 210*p* may output information regarding the analysis of current versus past performance of the P-CSCF 202*p* (e.g., including control signal(s) to send and/or recommended action(s) to take to resolve issues). For example, if the analysis reveals a sudden increase in call drop rates (e.g., a rate in increase of call drops that exceeds a particular rate), the output generator 210*p* may output a recommendation that traffic be re-routed and/or that resource allocation be adjusted to alleviate congestion. In one or more embodiments, the output generator 210*p* may utilize one or more LLMs to help articulate the insights in a human-readable format. In certain embodiments, the output generator 210*p* may output the insights for display or presentation on a user interface (e.g., a graphical user interface (GUI) or the like). In various embodiments, the output generator 210*p* may additionally, or alternatively, send signal(s) or command(s) to the P-CSCF 202*p* and/or related component(s)/functionality to make the network-related adjustments. For example, the output generator 210*p* may instruct the P-CSCF 202*p* and/or related component(s)/functionality to reroute traffic through a determined less congested path or to adjust session parameters to improve or optimize (or approximately optimize) resource allocation. As another example, the output generator 210*p* may command the P-CSCF 202*p* and/or related component(s)/functionality to increase bandwidth allocation or to prioritize certain types of traffic to alleviate congestion.

In one or more embodiments, the GenAI engine 210*e* may facilitate the efficient management of data within the vector database(s) 210*v* by implementing strategies for aggregating historical data. This may involve encoding both historical and current data into vectors so as to ensure that all information, including recent events, is readily accessible for analysis. By maintaining up-to-date data, the system can provide fast responses to prompts that require comprehensive insights.

To improve or optimize (or approximately optimize) storage and processing efficiency, the GenAI engine 210*e* may cause the vector database(s) 210*v* to process historical and current data separately. For recent data, such as data in the last five minutes, the last ten minutes, or the like, all relevant columns and logs may be retained to allow for detailed analysis of the current data. However, for historical data (e.g., those older than five minutes, ten minutes, or the like), the system may aggregate the information by reducing the number of columns of data to only the most critical ones. This may, for instance, involve summarizing data from five-minute intervals to daily or weekly aggregates, where essential metrics, such as call frequency and duration, are the only ones that are retained. Such aggregation not only conserves storage space, but also streamlines data retrieval and analysis, thereby allowing the system to focus on significant trends and patterns over time.

Figure 2C:
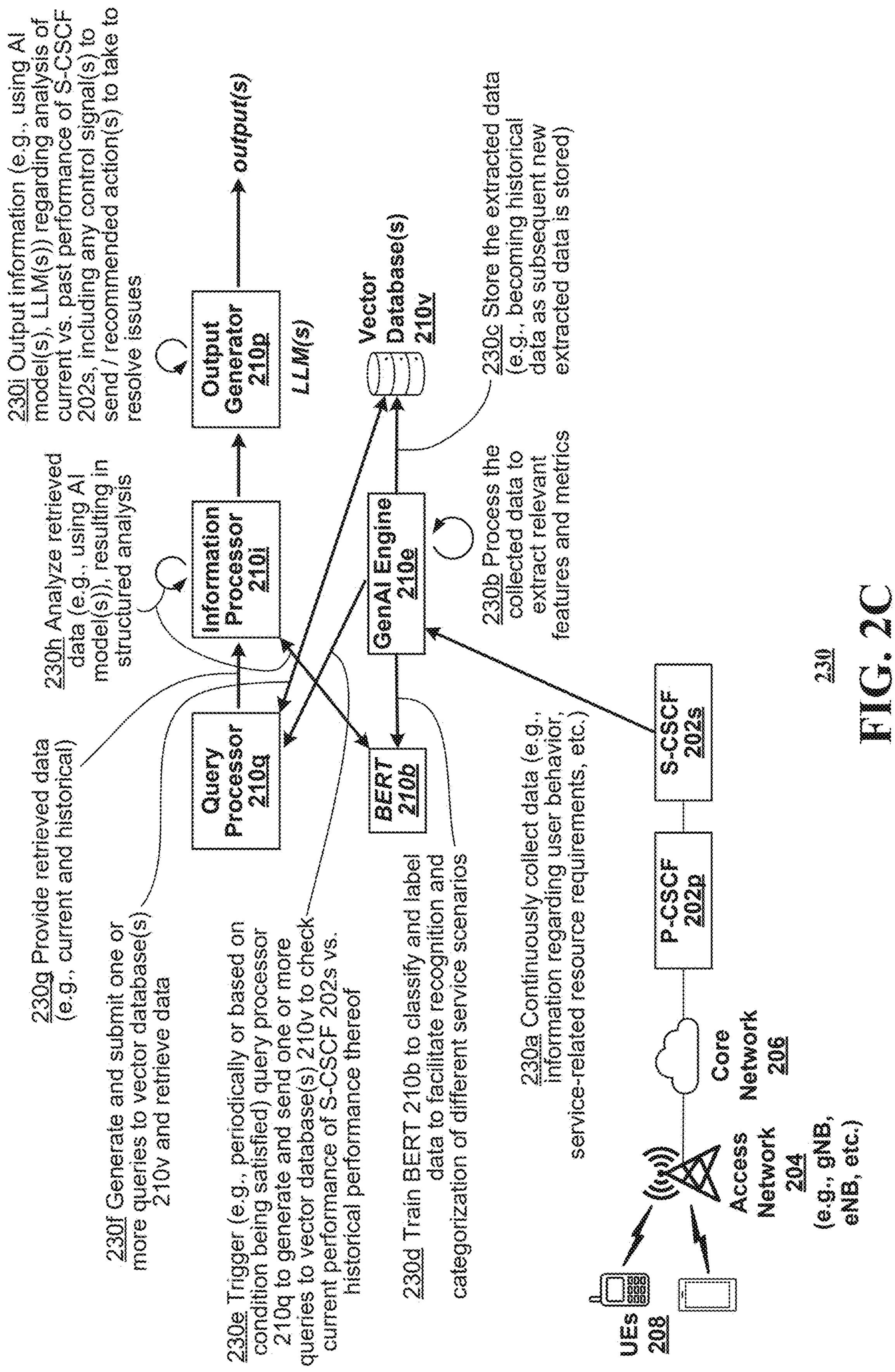
FIG. 2C illustrates an example use case of a RAG system with respect to a Serving CSCF (S-CSCF), in accordance with various aspects described herein.

FIG. 2C illustrates an example use case 230 of the RAG system 210 with respect to the S-CSCF 202*s*, in accordance with various aspects described herein. In exemplary embodiments, the RAG system 210 may utilize ML to personalize user experiences, dynamically adjust service quality, and/or predict user behavior for proactive management.

At 230*a*, the GenAI engine 210*e* may continuously collect data from the S-CSCF 202*s*. The data may include information regarding common user behaviors (e.g., call frequency, duration, etc.), specific resource requirements per service (e.g., bandwidth needs for high-definition video calls, latency requirements for voice calls, jitter tolerance for conference calls, etc.), and/or the like. Some or all of this information may allow for the establishing of performance benchmarks and the identification of typical usage patterns, which can aid in tailoring services to individual user needs.

At 230*b*, GenAI engine 210*e* may process the collected data to extract relevant features and metrics. For example, the GenAI engine 210*e* may identify patterns in user interactions that indicate preferences for certain services, such as a preference for video calls over voice calls or frequent use of conference calling features. As another example, the GenAI engine 210*e* may detect anomalies in resource usage, such as unexpected spikes in bandwidth consumption (e.g., above a threshold) during off-peak hours or consistent latency issues (e.g., lasting longer than a threshold period) affecting call quality.

At 230*c*, the GenAI engine 210*e* may store the extracted data in the vector database(s) 210*v*—e.g., in a manner similar to that described above with respect to FIG. 2B.

At 230*d*, the GenAI engine 210*e* may cause the BERT model 210*b* to be trained to classify and label the data, which can facilitate the recognition and categorization of different service scenarios. During this training, the BERT model 210*b* may learn to identify patterns and features within the data that correspond to specific service conditions or user behaviors. For example, the training process may involve classifying data into categories such as "high bandwidth usage," "frequent call drops," or "user preference for video calls." The BERT model 210*b* may learn to recognize these patterns by analyzing historical data and identifying key indicators associated with each category. Labeling involves assigning these categories to new data as it is processed, which allows the RAG system 210 to quickly identify and respond to different service scenarios. This enables the S-CSCF 202*s* to dynamically adjust service quality and provide personalized user experiences based on real-time (or near real-time) insights. As the terms (and related terms) are used herein, real-time may mean over a span of fractions of a second up to a second (or the like), near real-time may mean over the course of a few seconds (e.g., 1 to 5 seconds or the like), and non-real-time may mean over a time period that is greater than a few seconds (e.g., greater than 5 seconds or the like).

At 230*e*, the GenAI engine 210*e* may trigger the query processor 210*q* to generate and send one or more queries to the vector database(s) 210*v* to check the current performance of the S-CSCF 202*s* versus the historical performance thereof. Triggering of the querying may be in manner(s) similar to that described above with respect to FIG. 2B. In the context of the S-CSCF 202*s*, the GenAI engine 210*e* may trigger the querying based on detection of changes in user behavior patterns or shifts in service demand. For instance, the GenAI engine 210*e* may identify such changes by analyzing real-time (or near real-time) data collected from the S-CSCF 202*s*. This data may include metrics, such as user preferences for certain services, variations in resource requirements, and/or usage patterns, which the GenAI engine 210*e* may continuously monitor and compare against predefined benchmarks or historical trends stored in the vector database(s) 210*v*. If such an analysis reveals deviations from expected user behavior or service demand, such as a sudden increase in video call usage (e.g., above a threshold usage frequency) or a shift in peak usage times (e.g., from certain hours of the day to different hours of the day), the GenAI engine 210*e* may detect such deviation(s) and trigger the query processor 210*q* to initiate the querying. This allows for proactive adjustments to service quality and resource allocation, which can enhance user satisfaction and network efficiency.

At 230*f*, the query processor 210*g* may generate and submit one or more queries to the vector database(s) 210*v* based on the trigger, and may retrieve data therefrom using such queries. For example, the query processor 210*g* may use structured queries that are predefined and formatted to extract specific information from the vector database(s) 210*v*. A structured query may be, for instance, in SQL—e.g., "SELECT user_behavior, service_usage FROM vector_database WHERE timestamp BETWEEN '2023-10-01' AND '2023-10-31'" which would retrieve the user behavior and service usage data from a particular vector database 210*v*.

At 230*g*, the query processor 210*g* may provide the retrieved data (e.g., current and historical) to the information processor 210*i* for analysis.

At 230*h*, the information processor 210*i* may analyze the retrieved data (e.g., using AI model(s)), resulting in structured analysis. This process may involve collaboration with the BERT model 210*b* to enhance the analysis. For example, BERT model 210*b* can help categorize service scenarios by identifying patterns in user interactions, such as frequent service disruptions or high data usage during specific times. By categorizing these scenarios, the information processor 210*i* can identify trends, such as increased demand for video services during peak hours, or issues like recurring connectivity problems in certain regions. The BERT model 210*b* is particularly useful in the context of the S-CSCF 202*s* due to the S-CSCF 202*s*'s ability to handle complex logical information and provide real-time (or near real-time) insights into call quality. Unlike the P-CSCF 202*p*, which primarily deals with routing and network load, the S-CSCF 202*s* provides data on user interactions and service conditions. The BERT model 210*b*'s transformer-based architecture allows it to analyze bidirectional context, which makes it useful for assessing call performance and categorizing service scenarios. For instance, if a user experiences poor call quality due to low reception, the BERT model 210*b* can classify the call as "bad quality" based on call-related data. This classification can then be passed to the information processor 210*i*, which can combine the BERT model 210*b*'s real-time analysis with historical data to make an informed decision. By providing a "second opinion," the BERT model 210*b* enhances the RAG system 210's ability to quickly identify issues and recommend actions, such as adjusting service parameters or alerting users of potential connectivity problems. In other words, the BERT model 210*b*'s ability to understand context and semantics allows it to label data accurately, providing insights into user preferences and/or service performance. This enables the RAG system 210 to make informed decisions, such as reallocating resources to high-demand areas or adjusting service parameters to improve user satisfaction.

At 230*i*, the output generator 210*p* may output information regarding the analysis of current versus past performance of the S-CSCF 202*s* (e.g., including control signal(s) to send and/or recommended action(s) to take to resolve issues)—e.g., in manner(s) similar to that described above with respect to FIG. 2B. The determination of whether the service is performing well or poorly may be based on predefined performance metrics and thresholds. For example, well-performing service may be characterized by low call drop rates (e.g., below a threshold rate), low latency (e.g., below a threshold latency), and/or high user satisfaction scores (e.g., above a threshold score). Conversely, poor performance could be indicated by increased call drop rates (e.g., above the threshold rate), high latency (e.g., above the threshold latency), or frequent service disruptions (e.g., frequency above a threshold frequency or user satisfaction scores below a threshold score). Based on this evaluation, appropriate actions may be taken within the S-CSCF 202*s* to rectify any issues and improve or optimize (or approximately optimize) service quality. As some examples, the RAG system 210 may cause resource allocation to be automatically adjusted, such as via an increase in bandwidth or a rerouting of traffic, to alleviate congestion and improve performance. In various embodiments, the output generator 210*p* may communicate with other network management systems to automate fixes, such as deploying additional resources or adjusting configurations. If manual intervention is required, the output generator 210*p* may generate alerts or reports for network administrators that detail the issues and identify suggested corrective actions. For instance, if the output indicates high call drop rates, the output generator 210*p* and/or an associated system may cause an automatic increase in capacity or may notify an admin to investigate further. By providing clear insights and recommendations, the output generator 210*p* enables timely and effective responses to maintain improved or optimal service quality.

Figure 2D:
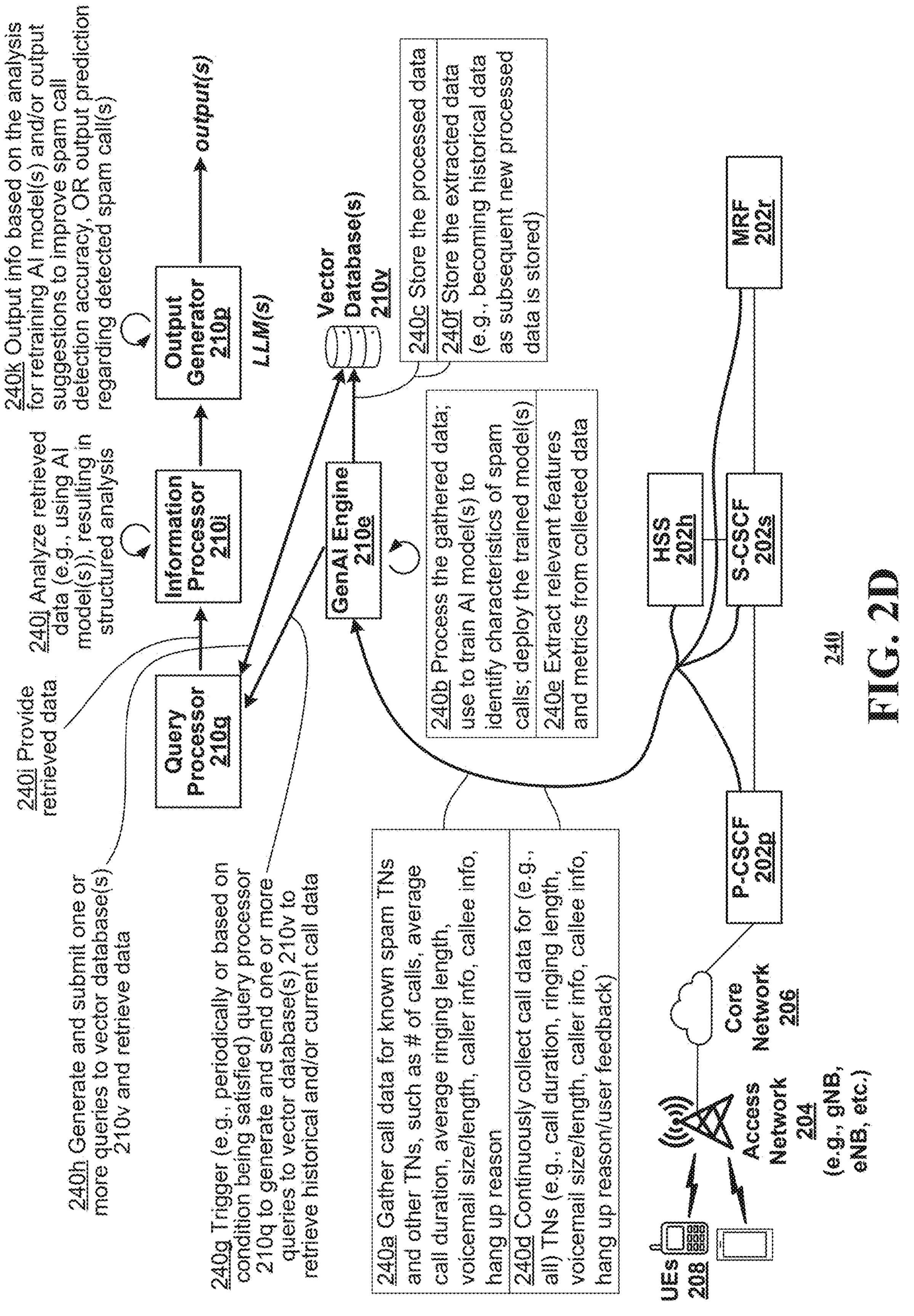
FIG. 2D illustrates an example use case of a RAG system for detecting and filtering AI-generated spam and/or threatening voice communications, in accordance with various aspects described herein.

FIG. 2D illustrates an example use case 240 of the RAG system 210 for detecting and filtering AI-generated spam and/or threatening voice communications, in accordance with various aspects described herein. In exemplary embodiments, the system may utilize AI to analyze call data and user feedback to enhance spam detection capabilities.

At 240*a*, the GenAI engine 210*e* may gather call data for known spam telephone numbers (TNs) and other TNs. The call data may include the number of calls in a short period (e.g., within a minute, within two minutes, or the like), average call duration, average ringing length, voicemail size/length, caller and/or callee information, hang-up reasons, and/or the like. In various embodiments, the call data may be collected from one or more components, such as the S-CSCF 202*s*, the P-CSCF 202*p*, the HSS 202*h*, and/or the MRF 202*r* to establish a comprehensive dataset for analysis. The call may enable the RAG system 210 to establish an initial capability of recognizing spam TN calling patterns.

At 240*b*, the GenAI engine 210*e* may process the gathered data and use the processed data to train AI model(s) to identify characteristics of spam calls. This may involve training the AI model(s) to identify common characteristics of spam calls, which may then be deployed for use by the information processor 210*i* and/or the output generator 210*p*. The information processor 210*i* may use the AI model(s) to analyze retrieved data and to identify patterns and anomalies in call behavior. Additionally, or alternatively, the output generator 210*p* may use the AI model(s) to articulate insights and generate recommendations regarding spam detection based on the analysis.

At 240*c*, the GenAI engine 210*e* may cause the processed data to be stored in the vector database(s) 210*v*—e.g., in manner(s) similar to that described above with respect to FIG. 2B. This facilitates efficient retrieval and analysis for future recommendations and performance assessments. The storage may support the continuous learning process and enable the system to adapt to new spam call patterns.

At 240*d*, the GenAI engine 210*e* may continuously collect call data for (e.g., all) TNs. This may include real-time (or near real-time) data collection for ongoing analysis purposes. The call data may include, for instance, information regarding call duration, ringing length, voicemail size/length, caller and/or callee information, hang-up reasons, and/or the like.

At 240*e*, the GenAI engine 210*e* may extract relevant features and metrics from the collected data, and at 240*f*, the extracted data may be stored in the vector database(s) 210*v*, becoming historical data as new extracted data is added. This enables the RAG system 210 to maintain an up-to-date understanding of spammer behavior. In one or more embodiments, a user feedback mechanism may be implemented by or may be in association with the RAG system 210 to encourage call terminating users to report whether an incoming call from a TN is spam. This can be done through automated short message service (SMS) notifications, such as: "We observed that you received a call from [xxx] that we consider a spam risk. Reply 1 if you also think it is spam." User feedback may be obtained by the GenAI engine 210*e* and stored in the vector database(s) 210*v* for continuous learning and improvement.

At 240*g*, the GenAI engine 210*e* may trigger the query processor 210*q* to generate and send one or more queries to the vector database 210*v* to retrieve historical and/or current call data—e.g., in manner(s) similar to that described above with respect to FIG. 2B.

At 240*h*, the query processor 210*q* may generate and submit one or more queries to the vector database(s) 210*v* based on the trigger, and may retrieve data therefrom using such queries. Structured queries may be used to extract specific information, such as call patterns and user feedback.

At 240*i*, the query processor 210*q* may provide the retrieved data (e.g., current and historical) to the information processor 210*i* for analysis.

At 240*j*, the information processor 210*i* may analyze the retrieved data (e.g., using AI model(s)), resulting in structured analysis. This analysis may involve identifying correlations between call patterns and user feedback, which can aid in detecting emerging spam tactics.

At 240*k*, the output generator 210*p* may, based on the analysis, output information for re-training the AI model(s) and/or that provide suggestions to improve spam call detection accuracy. Re-training may involve updating the AI model(s) with new data to enhance their ability to identify spam patterns. Here, the output generator 210*p* may identify new patterns or anomalies based on the information processor 210*i*'s analysis of recent call data and/or user feedback. The output generator 210*p* may communicate these insights to the GenAI engine 210*e*, which may use the updated data to refine the AI model(s). Re-training ensures that the AI model(s) remain effective in detecting evolving spam tactics. For example, if new spam patterns are detected, the AI model(s) can be updated to recognize these patterns, thereby improving detection accuracy. In one or more embodiments, the output generator 210*p* may additionally, or alternatively, generate actionable suggestions to improve spam detection accuracy. These suggestions may include adjusting thresholds for spam detection, implementing new spam filtering rules, and/or enhancing user feedback mechanisms. The output generator 210*p* may derive these suggestions from the analysis performed by the information processor 210*i*, and may communicate them to network administrators or automated systems that are responsible for implementing such changes. For instance, if the output generator 210*p* identifies a specific TN as a frequent source of spam, the output generator 210*p* may suggest blocking that TN (e.g., for all users) or increasing monitoring with respect to that TN. These suggestions can be communicated to network management systems, which can automate actions such as updating call filters or alerting users. By providing clear and actionable insights, the output generator 210*p* enables timely interventions to maintain a secure communication environment.

In various embodiments, the RAG system 210 may include or may be implemented with a whitelisting mechanism that maintains a whitelist of trusted TNs that are exempt from spam detection, such as those used by government agencies, known businesses, known organizations, and/or the like. This ensures that such TNs are not mistakenly flagged as spam. The RAG system 210 may regularly update the whitelist based on user feedback, updated government/business/organization information, etc.

In various embodiments, the RAG system 210 may coordinate with the HSS 202*h* to analyze subscriber data, perform predictive maintenance, perform automated troubleshooting, offer personalized service recommendations, and/or provide improved authentication mechanisms. In one or more embodiments, the RAG system 210 may coordinate with the AS 202*a* to facilitate improved automated service provisioning and management for intelligent applications that are deployed for services, such as voice recognition and video conferencing. In certain embodiments, the RAG system 210 may coordinate with the BGCF to provide predictive analytics for improving or optimizing (or approximately optimizing) call routing to a PSTN for reduced cost and improved call quality. Some or all of such embodiments relating to the HSS 202*h*, the AS 202*a*, the BGCF, and/or any other CSCF of the IMS may involve steps similar to those described above with respect to one or more of FIGS. 2B, 2C, and 2D.

In certain example implementations, the GenAI engine 210*e* may be configured to perform adaptive monitoring of IMS-related data. For instance, the GenAI engine 210*e* may, based on received data relating to the P-CSCF 202*p* and/or the S-CSCF 202*s*, perform an analysis relating to the received data. As an example, the GenAI engine 210*e* may compare the received data with historical data to determine whether a difference between the received data and the historical data (e.g., differences in call drop rates, differences in latency, differences in resource usage, etc.) is less than a predetermined threshold. Where the GenAI engine 210*e* determines that the difference between the received data and the historical data is not less than the predetermined threshold, the GenAI engine 210*e* may obtain additional data from the P-CSCF 202*p* and/or the S-CSCF 202*s*. This additional data may relate to the status of the P-CSCF 202*p* and/or the S-CSCF 202*s*, such as error logs, session statistics, user feedback, and/or the like associated with those components. The GenAI engine 210*e* may analyze this additional data to identify potential factors that may have led to the above-threshold differences, which can inform the GenAI engine 210*e* on particular adjustments that can be made for the P-CSCF 202*p* and/or the S-CSCF 202*s* (e.g., adjusting routing paths, reallocating resources, etc.). The GenAI engine 210*e* may then provide commands regarding such adjustments to the P-CSCF 202*p* and/or the S-CSCF 202*s* and/or their management systems for implementation. In this way, the GenAI engine 210*e* may limit its collection of additional data relating to the P-CSCF 202*p* and/or the S-CSCF 202*s* to when the initially received data reflects a poor or abnormal condition. This reduces excess requests for data, which avoids excess traffic volume over the network that could otherwise negatively impact network performance. If the GenAI engine 210*e* determines that the abnormal condition is no longer present (i.e., the threshold is no longer being exceeded), the GenAI engine 210*e* can cease the collection of additional data from the P-CSCF 202*p* and/or the S-CSCF 202*s*, thereby further improving or optimizing network performance and reducing unnecessary data traffic. The additional data can be used to analyze the cause of the poor or abnormal condition, thereby providing an improvement over existing system management methods, resulting in a practical application that enhances network and device performance monitoring.

It is to be understood and appreciated that, although one or more of FIGS. 2A to 2D might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein. Furthermore, while various devices, networks, systems, subsystems, functions, servers, engines, processors, generators, etc. may have been illustrated in one or more of FIGS. 2A to 2D as separate devices, networks, systems, subsystems, functions, servers, engines, processors, generators, etc., it will be appreciated that multiple devices, networks, systems, subsystems, functions, servers, engines, processors, generators, etc. can be implemented as a single device, network, system, subsystem, function, server, engine, processor, generator, etc., or a single device, network, system, subsystem, function, server, engine, processor, generator, etc. can be implemented as multiple devices, networks, systems, subsystems, functions, servers, engines, processors, generators, etc. Additionally, functions described as being performed by one device, network, system, subsystem, function, server, engine, processor, generator, etc. may be performed by multiple devices, networks, systems, subsystems, functions, servers, engines, processors, generators, etc., or functions described as being performed by multiple devices, networks, systems, subsystems, functions, servers, engines, processors, generators, etc. may be performed by a single device, network, system, subsystem, function, server, engine, processor, generator, etc.

Figure 2E:
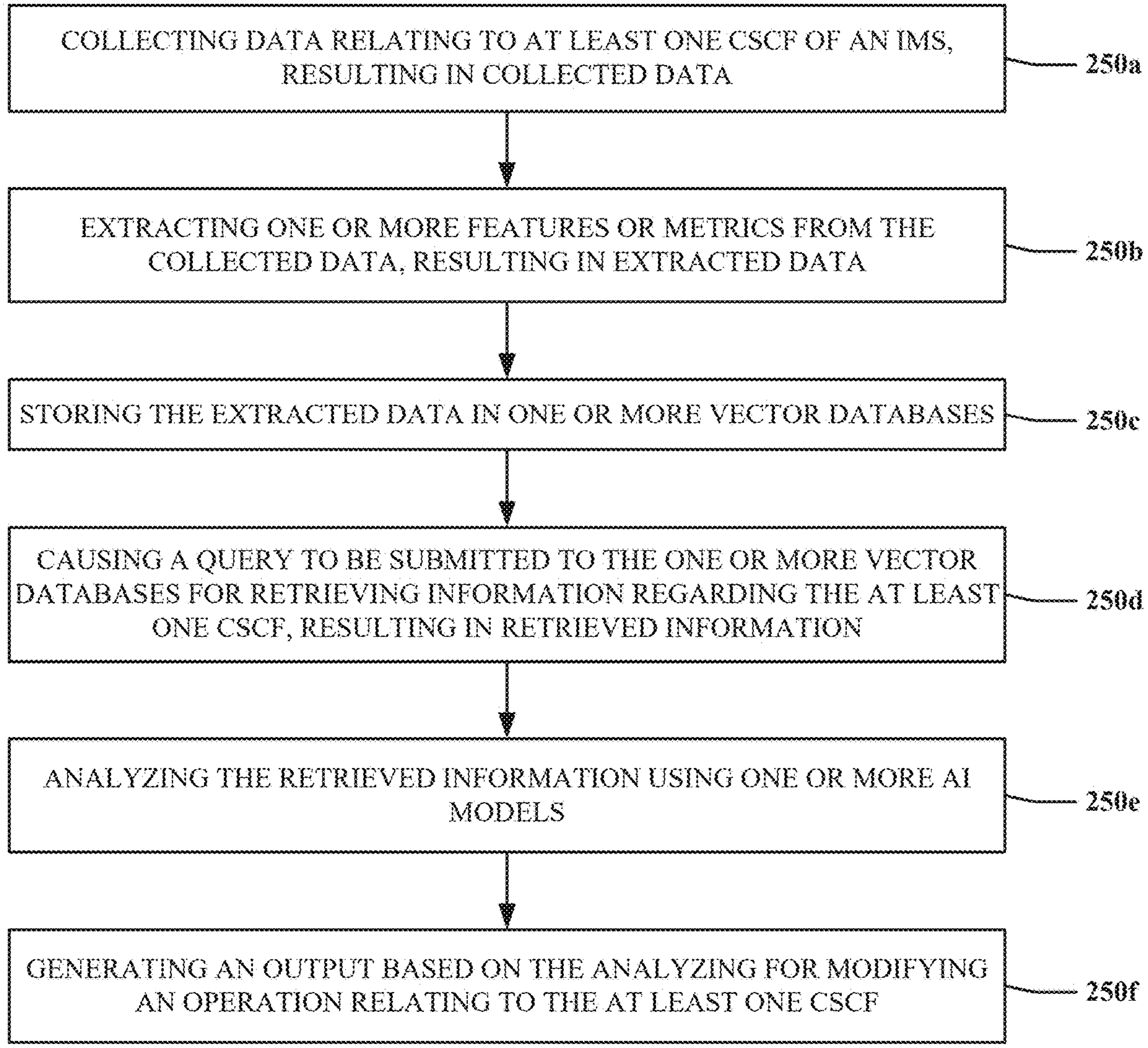
FIG. 2E depicts an illustrative embodiment of a method in accordance with various aspects described herein.

FIG. 2E depicts an illustrative embodiment of a method 250 in accordance with various aspects described herein.

At 250*a*, the method can include collecting data relating to at least one CSCF of an IMS, resulting in collected data. For example, the RAG system 210 can, similar to that described above with respect to one or more of FIGS. 2A to 2D, perform one or more operations that include collecting data relating to at least one CSCF of an IMS, resulting in collected data.

At 250*b*, the method can include extracting one or more features or metrics from the collected data, resulting in extracted data. For example, the RAG system 210 can, similar to that described above with respect to one or more of FIGS. 2A to 2D, perform one or more operations that include extracting one or more features or metrics from the collected data, resulting in extracted data.

At 250*c*, the method can include storing the extracted data in one or more vector databases. For example, the RAG system 210 can, similar to that described above with respect to one or more of FIGS. 2A to 2D, perform one or more operations that include storing the extracted data in one or more vector databases.

At 250*d*, the method can include causing a query to be submitted to the one or more vector databases for retrieving information regarding the at least one CSCF, resulting in retrieved information. For example, the RAG system 210 can, similar to that described above with respect to one or more of FIGS. 2A to 2D, perform one or more operations that include causing a query to be submitted to the one or more vector databases for retrieving information regarding the at least one CSCF, resulting in retrieved information.

At 250*e*, the method can include analyzing the retrieved information using one or more AI models. For example, the RAG system 210 can, similar to that described above with respect to one or more of FIGS. 2A to 2D, perform one or more operations that include analyzing the retrieved information using one or more AI models.

At 250*f*, the method can include generating an output based on the analyzing for modifying an operation relating to the at least one CSCF. For example, the RAG system 210 can, similar to that described above with respect to one or more of FIGS. 2A to 2D, perform one or more operations that include generating an output based on the analyzing for modifying an operation relating to the at least one CSCF.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2F:
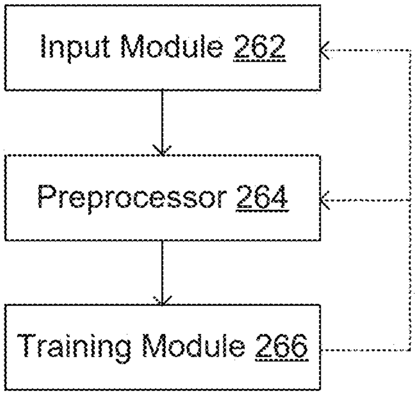
FIG. 2F is a diagram of an example AI architecture, which may be used to facilitate training or pre-training of one or more AI models, including, for instance, large language models (LLMs), in accordance with various aspects described herein.

Referring to FIG. 2F, an example AI architecture 260 may be used to facilitate training and/or pre-training of AI models, such as AI model(s) described above with respect to one or more of FIGS. 2A to 2D. For instance, the AI architecture 260 may be used to facilitate training and/or pre-training of an LLM associated with the GenAI engine 210*e*, the information processor 210*i*, and/or the output generator 210*p*, such as an LLM that is based on the transformer model 270 illustrated in FIG. 2G and described in more detail below. The AI architecture 260 may include an input module 262, a preprocessor 264, and a training module 266. Some or all of these modules, which may be referred to as programs, processors, or agents, may be realized based on execution of instructions or data by one or more processors of a computing (or machine learning (ML)) system, such as the computing system 400 of FIG. 4 (described in more detail below).

The input module 262 may allow for input of (e.g., user-provided) data, such as datasets, parameters (e.g., weights, biases, and/or the like), etc., that can be used to train models and/or obtain predictions from models. In some cases, datasets may be labeled and may include inputs (e.g., observed or measured values) and known output data. Labeled datasets may facilitate supervised (or guided) learning.

Although not shown, the AI architecture 260 may include a library of ML models or algorithms, such as, for instance, one or more classifiers (e.g., a naïve Bayes classifier or the like), one or more support vector machines, one or more artificial neural networks (e.g., transformer neural networks, convolutional neural networks, and/or the like), one or more learned decision trees, and so on. Each of the ML algorithms may be associated with various parameters.

The preprocessor 264 may be equipped with one or more preprocessing algorithms that are configured to prepare input datasets for processing by the training module 266. Such preprocessing may include discretization (where values are binned or converted into nominal values), component analysis, data estimation, feature selection, feature extraction (e.g., dimensionality reduction, data removal, statistical analysis, threshold-based filtering, etc.), data interpolation, and/or the like.

The training module 266 may be configured to train and evaluate ML models. As an example, the training module 266 may be configured to perform unsupervised learning and/or supervised learning based in input datasets. In exemplary embodiments, the training module 266 may be capable of training and/or evaluating the performance of multiple models in parallel. In one or more implementations, the training module 266 may, despite operating on multiple ML models in parallel, train and evaluate the various ML models individually. In some implementations, the training module 266 may be capable of combining the procedure outcomes of multiple models to derive an aggregate outcome. Model evaluation or validation may involve a comparison of model outputs to known outputs or an analysis of model outputs relative to desired metrics.

In exemplary embodiments, certain processing techniques may be employed to generate usable data sets for feeding into the AI architecture 260 to train deep learning neural network model(s) to output predictions. Although not shown, the AI architecture 260 may include additional functional modules, such as those for gathering performance results and presenting (e.g., displaying) data regarding the results. While various components, modules, etc. may have been illustrated in FIG. 2F as separate components, modules, etc., it will be appreciated that multiple components, modules, etc. may be implemented as a single component, module, etc., or a single component, module, etc. may be implemented as multiple components, modules, etc. Additionally, functions described as being performed by one component, module, etc. may be performed by multiple components, modules, etc., or functions described as being performed by multiple components, modules, etc. may be performed by a single component, module, etc.

Figure 2G:
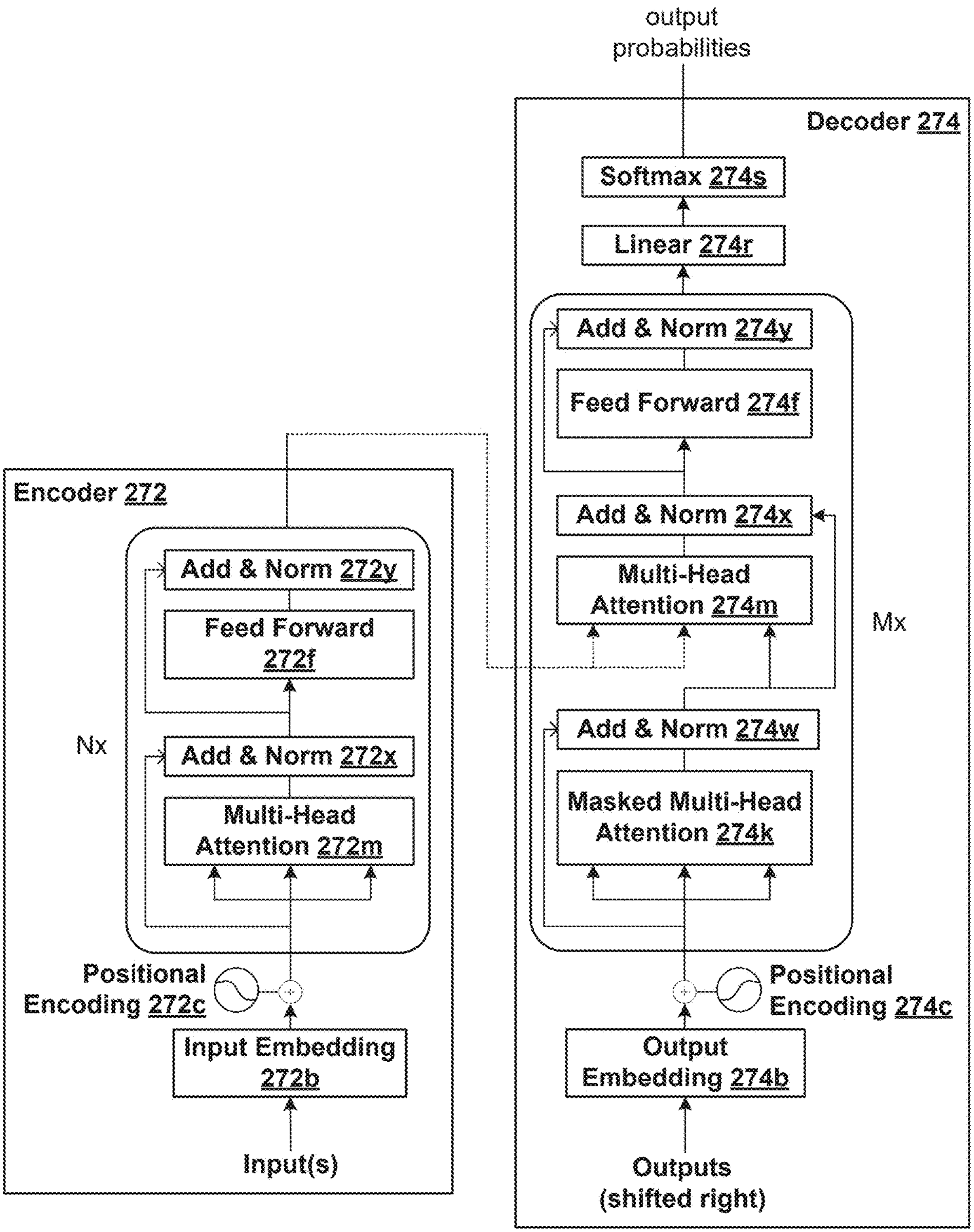
FIG. 2G is a diagram of an example transformer model, a portion or an entirety of which may serve as a functional building block of one or more LLMs, in accordance with various aspects described herein.

Referring to FIG. 2G, an example transformer model 270 (a portion or an entirety of which may serve as a functional building block of one or more LLMs (e.g., LLM(s) of associated with the GenAI engine 210*e*, the information processor 210*i*, and/or the output generator 210*p* described above with respect to one or more of FIGS. 2A to 2D)) may include an encoder 272 and a decoder 274. The encoder 272 may include an input embedding block 272*b*, a positional encoder 272*c*, and a series of (i.e., multiple (Nx)) identical layers that each has a multi-head attention block 272*m* and a feed forward block 272*f*. An input (e.g., text, such as a query or a prompt) may be converted into individual tokens (e.g., words, characters, etc.) that are fed into the input embedding block 272*b*. The input embedding block 272*b* may convert the tokens into continuous vectors, where each token is mapped to a high-dimensional space by way of a learned embedding matrix. The embedding matrix may be implemented in a lookup table or the like, where token indexes are associated with different vectors of a fixed size. The positional encoder 272*c* may derive fixed positional encodings or learned positional encodings to help capture positional information of tokens. Fixed positioning encodings may be generated using sinusoidal functions, where the different frequencies of sine/cosine functions correspond to unique positional encodings for the different positions in a given sequence. Learned positional encodings may be learned during training based on initially randomly chosen values that are optimized as part of the training process. In any case, the positional encodings may be combined with the input embeddings from the input embedding block 272*b* on an element-by-element basis, resulting in a processed input that may be fed into the series of layers. The processed input may be fed into the multi-head attention block 272*m* in the first layer. An addition (or residual connection) and normalization block 272*x* may operate on the processed input and the output of that multi-head attention block 272*m*. The output of the addition and normalization block 272*x* may be passed to the feed forward block 272*f* in that layer. An addition and normalization block 272*y* may operate on the output of the addition and normalization block 272*x* and the output of the feed forward block 272*f*. In essence, the multi-head attention block 272*m* of a given layer may enable the feed forward block 272*f* in that layer to model long term dependencies. Multi-head attention allows the model to simultaneously attend to different parts of the input sequence and weigh their importance based on the input sequence's internal relationships. This attention mechanism may be combined with the input sequence's representations to produce a new set of weighted representations. Iterating the identical layers allows the model to learn complex patterns and relationships in the data.

The decoder 274 may include an output embedding block 274*b*, a positional encoder 274*c*, and a series of (i.e., multiple (Mx)) identical layers that each has a masked multi-head attention block 274*k*, a multi head attention block 274*m*, and a feed forward block 274*f*. An output (shifted right) may be converted into individual tokens that are fed into the output embedding block 274*b*. The output embedding block 274*b* may convert the tokens into continuous vectors. The positional encoder 274*c* may derive fixed positional encodings or learned positional encodings to help capture positional information of tokens. The processed output may be fed into the masked multi-head attention block 274*k* in the first layer. An addition and normalization block 274*w* may operate on the processed output and the output of that masked multi-head attention block 274*k*. The output of the addition and normalization block 274*w* may be passed to the multi-head attention block 274*m* in that layer. Output(s) from the encoder 272 may also be fed into the multi-head attention block 274*m*. An addition and normalization block 274*x* may operate on the output of the addition and normalization block 274*w* and the output of multi-head attention block 274*m*. The output of the addition and normalization block 274*x* may be passed to the a feed forward block 274*f* in that layer. An addition and normalization block 274*y* may operate on the output of the addition and normalization block 274*x* and the output of the feed forward block 274*f*. The output of the addition and normalization block 274*y* may may be passed to a linear layer 274*r*, which may transform that output into a higher-dimensional space. The output of the linear layer 274*r* may be fed into a softmax layer 274*s*, which may be a non-linear activation function that normalizes the output to a probability distribution to ensure that all values are non-negative and add up to 1. Iterating the identical layers allows the model to learn complex patterns and relationships in the data.

Various types of transformer-based LLMs may be constructed by "stacking" the identical layers of the encoder 272 and/or the decoder 274 in particular arrangements and in combination with additional refinements/components. A given LLM constructed as such may then be trained or pre trained (e.g., using the AI architecture 260 of FIG. 2F, a similar AI architecture, a different AI architecture or a combination of some or all of these AI architectures) on a corpus of information and/or finetuned or instruction tuned to analyze/generate data (e.g., text, audio, and/or images).

Figure 3:
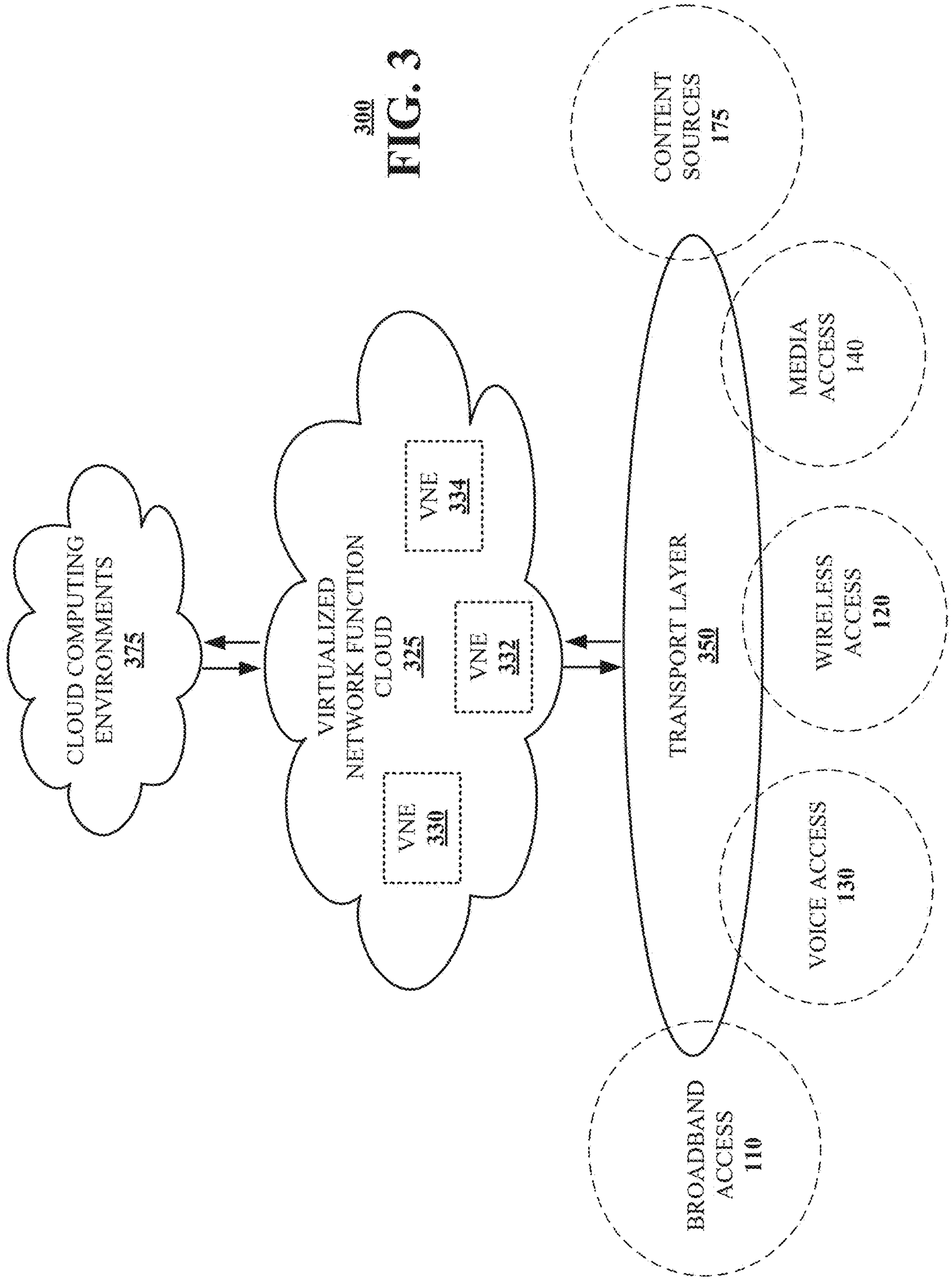
FIG. 3 is a block diagram illustrating an example, non-limiting embodiment of a virtualized communications network in accordance with various aspects described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of system 200, and method 250 presented in FIGS. 1 and 2A to 2E. For example, virtualized communications network 300 can facilitate, in whole or in part, GenAI-driven enhancements to IMS functionality.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
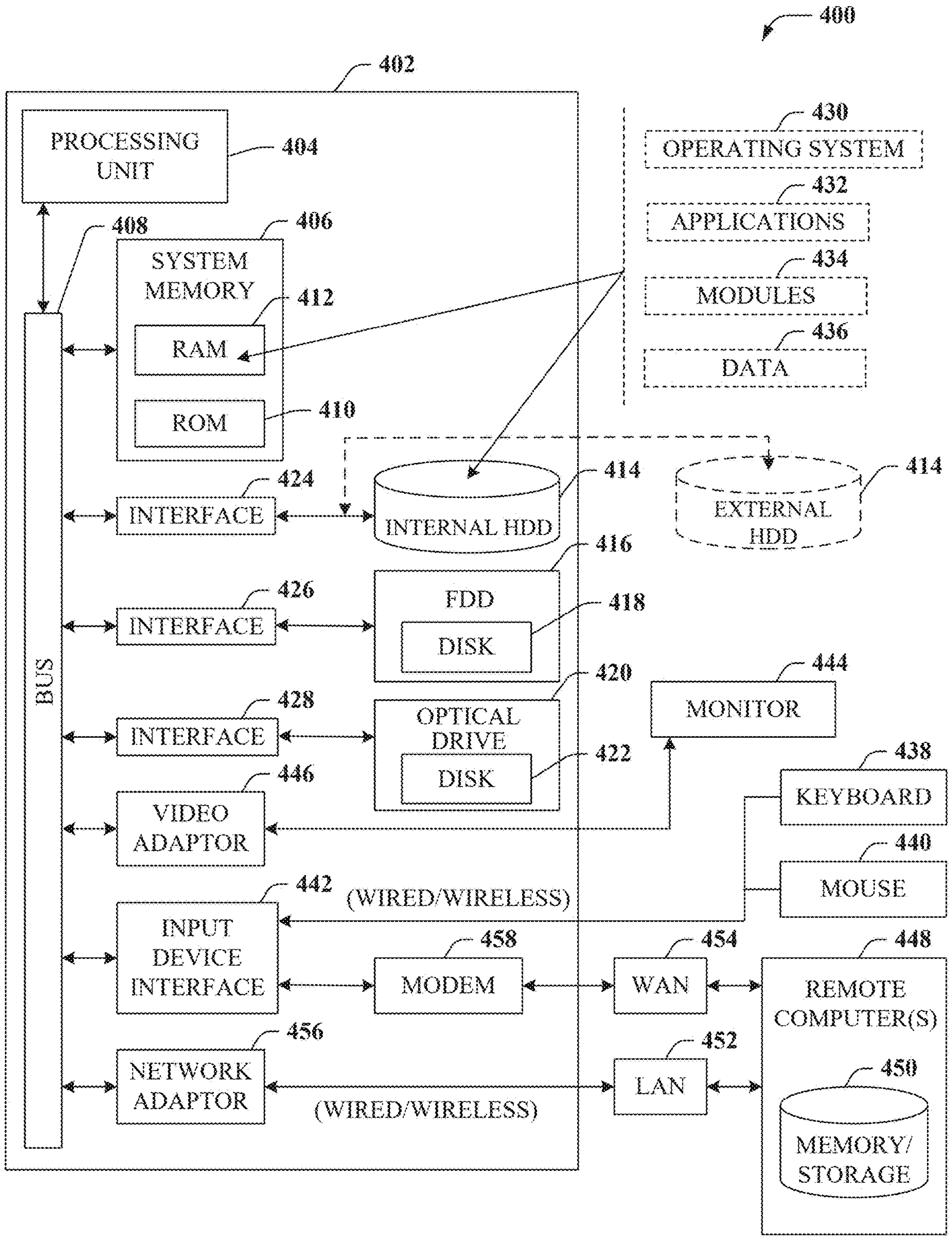
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, GenAI-driven enhancements to IMS functionality.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD

414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
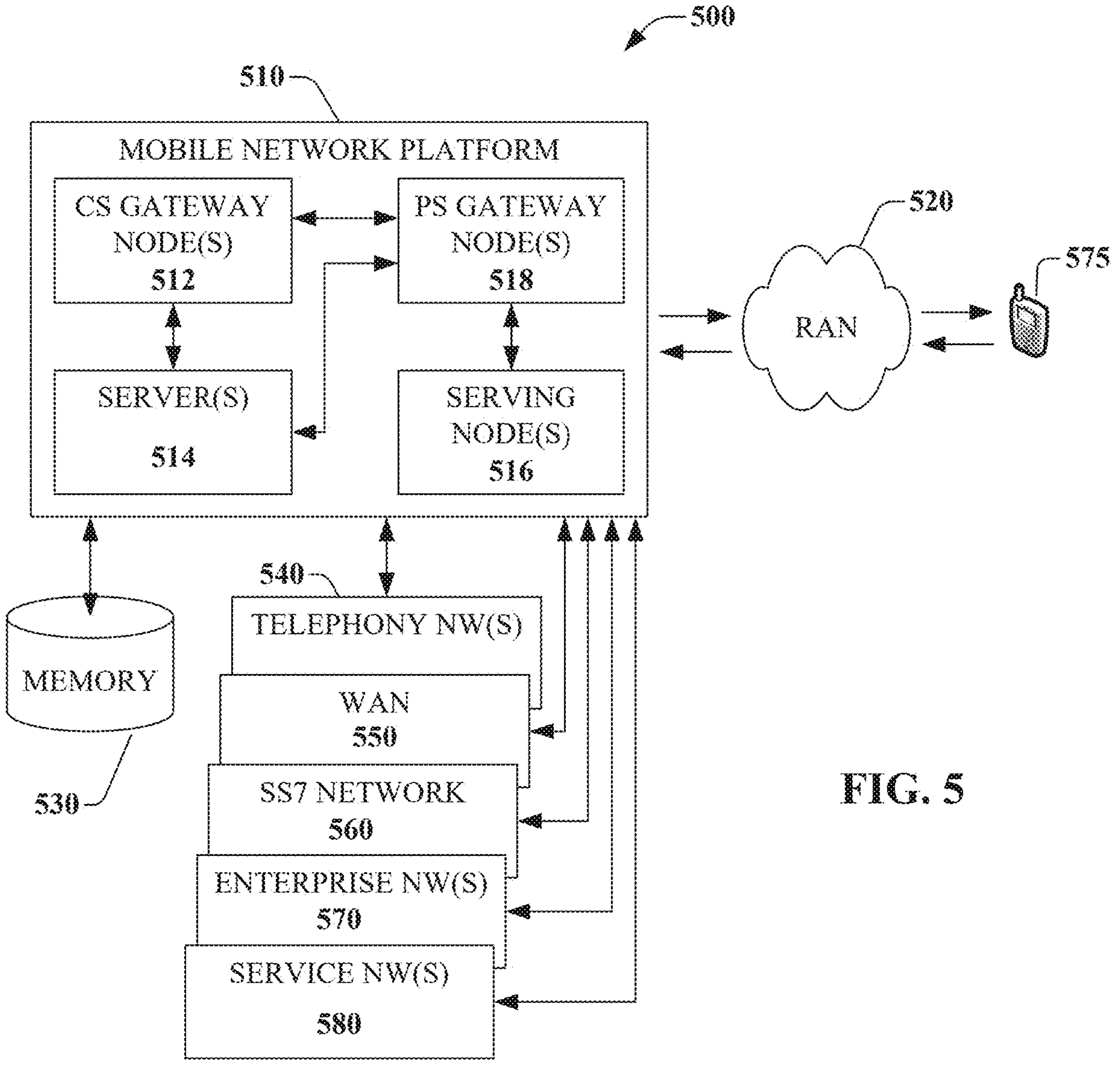
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, GenAI-driven enhancements to IMS functionality. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
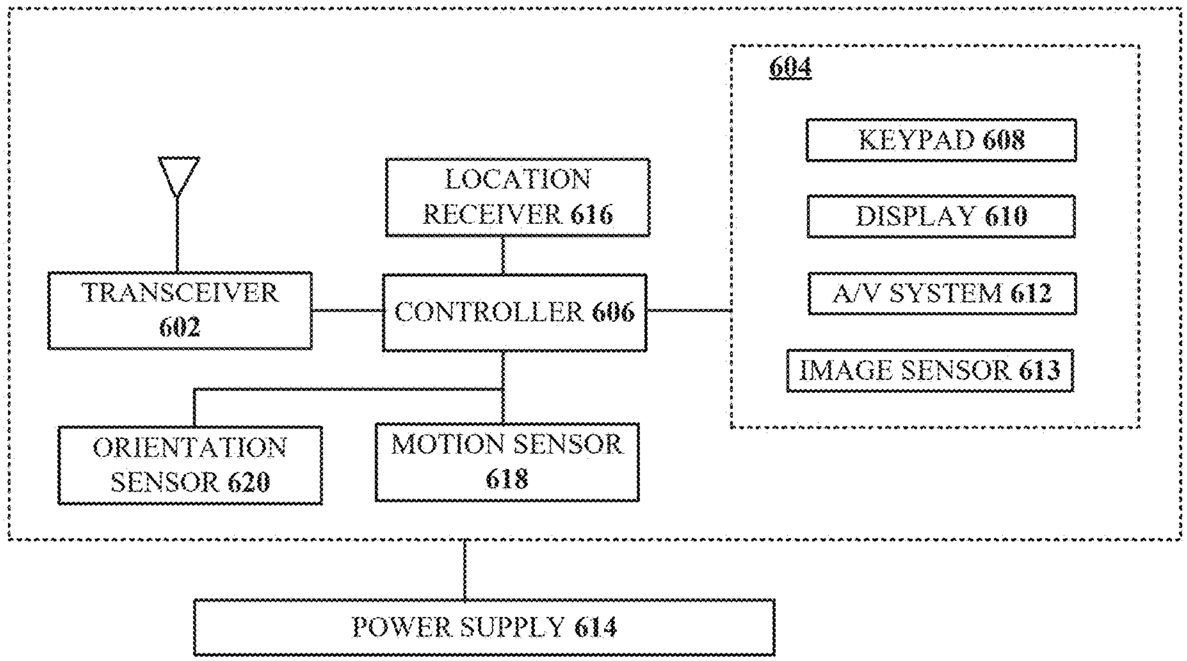
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate, in whole or in part, GenAI-driven enhancements to IMS functionality.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for conducting various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized. It is also to be understood and appreciated that the subject matter in one or more dependent claims may be combined with that in one or more other dependent claims.

What is claimed is:

1. A device, comprising:

a processing system including a processor; and a memory that stores executable instructions that, when executed by the processing system, facilitate performance of operations, the operations comprising:

collecting data relating to at least one Call Session Control Function (CSCF) of an Internet Protocol (IP) Multimedia Subsystem (IMS), resulting in collected data;

extracting one or more features or metrics from the collected data, resulting in extracted data;

storing the extracted data in one or more vector databases;

causing a query to be submitted to the one or more vector databases for retrieving information regarding the at least one CSCF, resulting in retrieved information;

analyzing the retrieved information using one or more artificial intelligence (AI) models, wherein the analyzing involves using the one or more AI models to generate a structured analysis of a current performance of the at least one CSCF as compared to a historical performance of the at least one CSCF as indicated in the retrieved information; and generating an output based on the analyzing for adjusting one or more network-related parameters relating to the at least one CSCF to mitigate performance degradation of the at least one CSCF.

2. The device of claim 1, wherein the output comprises a command to one or more network devices or network management systems to adjust the one or more network-related parameters.

3. The device of claim 1, wherein the output comprises a recommendation to perform one or more actions to resolve a detected issue.

4. The device of claim 1, wherein the at least one CSCF comprises a Proxy CSCF (P-CSCF) of the IMS.

5. The device of claim 4, wherein the data comprises Session Initiation Protocol (SIP) messages, network load metrics, routing path information, session statistics, or a combination thereof.

6. The device of claim 1, wherein the at least one CSCF comprises a Serving CSCF (S-CSCF) of the IMS.

7. The device of claim 6, wherein the data comprises information regarding user behavior, information regarding service-related resource requirements, or a combination thereof.

8. The device of claim 1, wherein at least one CSCF comprises a Proxy CSCF (P-CSCF) of the IMS, a Serving CSCF (S-CSCF) of the IMS, a Home Subscriber Server (HSS) of the IMS, and a Media Resource Function (MRF) of the IMS.

9. The device of claim 8, wherein the data comprises call-related data.

10. The device of claim 9, wherein the call-related data comprises call duration information, ringing length information, voicemail size information, caller information, callee information, hang up reason information, or a combination thereof of one or more telephone numbers (TN) associated with spam.

11. The device of claim 1, wherein the at least one CSCF comprises an Application Server (AS) of the IMS.

12. The device of claim 1, wherein the information comprises current information and historical information.

13. The device of claim 1, wherein the storing involves conversion of the extracted data into vectors.

14. The device of claim 1, wherein the causing is performed periodically or based on one or more conditions being satisfied.

15. The device of claim 1, wherein the query is in Structured Query Language (SQL).

16. A non-transitory machine-readable medium, comprising executable instructions that, when executed by a processing system including a processor, facilitate performance of operations, the operations comprising:

receiving call data from a plurality of Call Session Control Functions (CSCFs) of an Internet Protocol (IP) Multimedia Subsystem (IMS), resulting in received call data, wherein the call data relates to one or more telephone numbers (TNs) associated with spam;

utilizing the received call data to train an artificial intelligence (AI) model on characteristics of spam calls, resulting in a trained AI model;

storing vectors associated with the received call data in one or more vector databases;

continuously collecting additional call data from the plurality of CSCFs for storage as additional vectors in the one or more vector databases;

querying the one or more vector databases to retrieve current and historical call data, resulting in retrieved data;

performing an analysis of the retrieved data; and based on the analysis, utilizing at least a portion of the retrieved data to re-train the AI model for increased spam call detection accuracy.

17. The non-transitory machine-readable medium of claim 16, wherein the plurality of CSCFs comprise a Proxy CSCF (P-CSCF) of the IMS, a Serving CSCF (S-CSCF) of the IMS, a Home Subscriber Server (HSS) of the IMS, and a Media Resource Function (MRF) of the IMS.

18. The non-transitory machine-readable medium of claim 16, wherein the querying is performed periodically so as to enable continuous re-training of the AI model for increased spam call detection accuracy.

19. The non-transitory machine-readable medium of claim 16, wherein the call data or the additional call data comprises call duration information, ringing length information, voicemail size information, caller information, callee information, hang up reason information, or a combination thereof.

20. A method, comprising:

collecting, by a processing system including a processor, data relating to a Call Session Control Function (CSCF) of an Internet Protocol (IP) Multimedia Subsystem (IMS), resulting in collected data;

extracting, by the processing system, one or more features or metrics from the collected data, resulting in extracted data, for storage in one or more vector databases;

periodically causing, by the processing system, a query to be submitted to the one or more vector databases for retrieving information regarding the CSCF, resulting in retrieved information;

analyzing, by the processing system, the retrieved information using one or more artificial intelligence (AI) models; and causing, by the processing system, an output command generated based on the analyzing to be provided to one or more network devices or network management systems to trigger adjustment of one or more network-related parameters.

* * * * *